(12) United States Patent  
Sakai et al.

(10) Patent No.: US 6,661,645 B1  
(45) Date of Patent: Dec. 9, 2003

(54) SOLID ELECTROLYTIC CAPACITOR AND MANUFACTURING METHOD THEREOF

(75) Inventors: Atsushi Sakai, Nagano (JP); Takashi Ichimura, Nagano (JP); Hiroshi Nitoh, Nagano (JP); Naoki Kawamura, Nagano (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/979,751

(22) PCT Filed: May 25, 2000

(86) PCT No.: PCT/JP00/03350

§ 371 (c)(1),
(2), (4) Date: Nov. 27, 2001

(87) PCT Pub. No.: WO00/74091

PCT Pub. Date: Dec. 7, 2000

Related U.S. Application Data

(60) Provisional application No. 60/138,781, filed on Jun. 14, 1999.

(30) Foreign Application Priority Data

May 28, 1999 (JP) ............................................. 11-150292
Apr. 20, 2000 (JP) ......................................... 2000-119469

(51) Int. Cl.$^7$ ............................ H01G 9/00; H01G 9/04; H01G 9/10
(52) U.S. Cl. ....................... 361/523; 361/531; 361/533; 361/537; 361/538; 361/540; 29/25.03
(58) Field of Search ............................... 361/523–541; 29/25.03

(56) References Cited

U.S. PATENT DOCUMENTS 4,805,074 A * 2/1989 Harakawa et al.
4,814,947 A * 3/1989 Gunter

FOREIGN PATENT DOCUMENTS

| JP | 2-15611 | 1/1990 | ............ H01G/9/02 |
| JP | 3-188614 | 8/1991 | ............ H01G/9/05 |
| JP | 5-21290 | 1/1993 | ............ H01G/9/05 |
| JP | 6-69084 | 3/1994 | ............ H01G/9/05 |
| JP | 8-253677 | 10/1996 | ............ C08L/79/08 |
| JP | 9-320895 | 12/1997 | .......... H01G/9/004 |
| JP | 10-32145 | 2/1998 | .......... H01G/9/028 |
| JP | 10-144573 | 5/1998 | ............ H01G/9/04 |
| JP | 11-80596 | 3/1999 | ............ C09D/5/00 |

OTHER PUBLICATIONS

International Search Report for PCT/JP00/03350 dated Sep. 5, 2000.

* cited by examiner

Primary Examiner—Ha Tran Nguyen
(74) Attorney, Agent, or Firm—Sughrue Mion, PLLC

(57) ABSTRACT

A solid electrolytic capacitor comprising a capacitor element comprising a valve-acting metal substrate having on the surface thereof a dielectric film and a solid electrolytic layer provided on the dielectric film, the capacitor element provided with lead wires (lead frames), in which the bonding structure between the capacitor element and the lead frames is improved. The solid electrolytic capacitor has high strength at the bonded portion between the capacitor element and the lead frames and has excellent heat resistance and is highly reliable. Also, a method for manufacturing such a solid electrolytic capacitor is disclosed.

17 Claims, 6 Drawing Sheets

SOLID ELECTROLYTIC CAPACITOR AND MANUFACTURING METHOD THEREOF

CROSS REFERENCE TO RELATED APPLICATION

The present application is an application filed pursuant to Section 111(a) with a claim to priority to Provisional Application Serial No. 60/138,781 filed Jun. 14, 1999 pursuant to 35 U.S.C. Section 119(e)(1) in accordance with 35 U.S.C. 111(b).

TECHNICAL FIELD

The present invention relates to a solid electrolytic capacitor and to a manufacturing method thereof. More particularly, the present invention relates to a solid electrolytic capacitor comprising a capacitor element having a substrate comprising a valve-acting metal having a dielectric film on the surface thereof and a solid electrolyte layer on the substrate, the capacitor element having lead wires (lead frames). The solid electrolytic capacitor has excellent strength and heat resistance at the bonding portion between the capacitor element and the lead frames and is highly reliable.

BACKGROUND ART

To keep up with recent advancement of digitization or high frequency driving of electric equipment for attaining downsizing or electric power savings, demands for solid electrolytic capacitors having low impedance at high frequency range, high reliability and high capacitance are increasing.

Generally, a solid electrolytic capacitor has a basic structure that includes a plurality of single plate capacitor elements stacked one on another. Each single plate capacitor element has an etched valve-acting metal such as aluminum, tantalum or titanium, having a dielectric oxide film on the surface thereof. It also has a solid electrolyte layer comprising an organic substance layer such as a layer of an electroconductive polymer or an inorganic substance layer such as a layer of a metal oxide on the dielectric oxide film. Furthermore, it has an anode lead wire connected to an anode terminal of valve-acting metal (surface portion of end part where no solid electrolyte is provided) and on the other hand a cathode wire connected to an electroconducting part composed of a solid electrolyte (cathode part). The entire structure is sealed with an insulating resin such as an epoxy resin.

To manufacture a solid electrolytic capacitor having such a structure as described above and also having high reliability, the capacitor must have high strength and excellent heat resistance at the bonded portions between the capacitor element and the lead frames. In particular, chip-type capacitors which are surface mounted on an electronic circuit substrate are designed to have durability against heat at the reflow soldering by using a highly heat resistant material or by constructing the capacitor to enable relaxation of the thermal stress. These solid electrolytes have low resistance but are poor in the recovering activity of dielectric film. Accordingly, the dielectric film may occasionally undergo microscopic destructions due to the thermal stress or the like to increase the leakage current.

Some known structures for bonding between a capacitor element and a lead frame do not have always-sufficient heat resistance. For example, according to the method of JP-A-6-69084, a projecting metal plate is provided on the anode part of a stacked layer element, so that the element damages at the time of connecting to a lead frame can be reduced. According to the method of JP-A-9-320895, a lead frame is formed into a special shape so as to protect the element and then a stacked layer element is integrated therein. The examples shown in the figures of these patent applications have similar arrangement of an element to that in the present invention. However, the relationship in proper positioning between the lead frame and the element is not referred to and the effect thereof is not described. Furthermore, JP-A-10-144573 discloses a structure in which a projection is provided on the anode side of a lead frame and the element anode part is provided with a positioning part so as to be positioned to engage with the projection. The structure is essentially different from the present invention in that the anode part of capacitor element has a positioning part.

In the case of conventional solid electrolytic capacitors, when a lead frame composed of copper, a copper alloy or the like is bonded to the anode end part of a capacitor element, they are bonded with an electroconductive adhesive or mechanically connected by bending and caulking the terminals. Alternatively, they are bonded by welding with a lead based solder material, laser welding or the like. However, the bonding method using an electroconductive adhesive takes a long time for applying the adhesive. In particular, when a number of single plate capacitor elements are stacked and bonded, the working is very cumbersome. The mechanical bonding method by caulking the connected parts of lead frame is not suitable for those having small bonding parts and results in unstable bonding. Furthermore, in the case of welding with a lead based solder material, there is a fear that excessive lead removed from the welded part would cause problems such as environmental pollution. The bonding method by laser welding has the problem of increased costs and so forth.

In addition to these bonding methods, resistance welding of a terminal of capacitor element to a lead frame is known (JP-A-3-188614). This is to perform resistance welding using exclusively an iron nickel alloy (42 alloy) as the lead frame material. In addition, in the case where aluminum foil is used as the valve-acting metal of the capacitor element, the lead frame composed of copper, copper alloy or the like cannot be bonded by simple resistance welding. This is because resistance welding is a bonding method in which the metal at the part to be welded is molten for welding by heat generation (Joule heat) due to electric resistance and aluminum, copper, copper alloy and the like materials having high electroconductivity have low resistance so that they generate less heat. In addition because of good heat conductivity, the part to be bonded can be molten only insufficiently so that it is difficult to weld these materials.

Furthermore, among conventional solid electrolytic capacitors, those having a capacitor element bonded to a lead frame that has plating over the entire surface thereof are also known. However, when the lead frame is plated on its entire surface, superposed on the capacitor element and heat treated, it may be resulted that the plating metal is molten not only in the portion to be bonded with the capacitor element but also in the portion to be contact with the mold resin and a defect called solder ball will occur. The known structure to avoid such an inconvenience is obtained by a method of plating a copper substrate of a lead frame on the entire surface thereof with solder, removing the plating where the mold resin contacts when sealing therewith to expose the copper substrate, roughening the exposed surface, and then mounting a capacitor element on the roughened surface and bonding it to the surface (JP-A-5-21290). However, the method has problems that the amount of plating on the bonding part of the capacitor element is insufficient and that the bonding strength is low.

OBJECT OF THE INVENTION

The present invention is intended to provide a solid electrolyte capacitor and manufacturing method thereof free of the above-mentioned problems encountered in the conventional technology.

In order to reduce impedance, the contact area between a capacitor element and the cathode part of a lead frame (cathode-side lead frame) may be made as large as possible. However, this causes an increase in the leakage current after the reflow soldering or the like. The contact area is made large for the purpose of reducing the resistance on the cathode part of a capacitor element as much as possible and in addition, for protecting the element from mechanical or thermal stress at the time of lamination of elements, anodic welding or armoring with resin.

Despite these effects, if the cathode-side end corner part of a lead frame is present in the vicinity of the boundary between the cathode part and the insulating part of an element, there is a risk that stress concentration may occur in the vicinity of the boundary due to bending stress to rupture the dielectric film. Furthermore, silver paste used for bonding the lead frame to the element may enter from the boundary between the insulating part and the cathode electrically conducting layer directly into the vicinity of the dielectric film, giving rise to occurrence of short circuit at fine portions and increase in the leakage current. Because of these, the leakage current increases after the reflow soldering or the yield in the inspection process decreases.

Therefore, an object of the present invention is to provide a solid electrolytic capacitor having low impedance and high reliability by constructing the capacitor to enable relaxation of the thermal stress generated at the reflow soldering or the like and thereby establishing a method of preventing the increase of leakage current.

Another object of the present invention is to provide a solid electrolytic capacitor that in relation to its bonding structure is free of defects such as solder ball at the time of bonding the capacitor element to the lead frames by welding and also has excellent bonding strength.

Still another object of the present invention is to provide a solid electrolytic capacitor that in relation to the bonding structure of the anode part thereof enables bonding of the anode end part of the capacitor element to the lead frame by resistance welding, facilitates the work, gives high bonding strength and causes no environmental pollution or the like.

SUMMARY OF THE INVENTION

In order to attain the above-described object, the solid electrolytic capacitor of the present invention is constructed such that the contact area between a capacitor element and the cathode part of a lead frame is reduced while preventing the increase of resistance at the cathode part, namely, the length of a lead frame on the cathode side is reduced to a predetermined dimension, and a predetermined space is provided between the insulating part of the capacitor element and the lead frame to prevent the endmost part of the lead frame on the cathode side from approaching to the insulating part of the capacitor element, so that the stress concentration of the element around there can be mitigated and the excess silver paste for bonding can be prevented from entering from the vicinity of the boundary of the insulating part into the neighborhood of the dielectric layer.

Furthermore, in order to mitigate the stress concentration of the element in the vicinity of the endmost part of the lead frame on the cathode side, the endmost part of the lead frame is chamfered so that it can have a rounded structure. The increase of series resistance can be dealt with, for example, by eliminating the window part of the lead frame. In this instance, the position of the bonding the capacitor element to the lead frame is important. Accordingly, the lead frame is marked by half etching or a laser ray, so that the bonding position can be confirmed exactly.

As such actions being taken, the dielectric layer is scarcely subject to microscopic destructions by mechanical or thermal stress, and as a result the yield is improved and the leakage current does not increase after the reflow soldering or the like.

The term "circumferentially provide" as used herein means to provide by winding it around a certain member. The term "to place" as used herein shows not only the vertical relationship in the space but also includes the state where the matter to place and the material on which the matter is placed are disposed so as to contact each other. The term "bonded" as used herein means that two parts are connected and joined.

More specifically, the present invention provides the following solid electrolytic capacitor and method for manufacturing the solid electrolytic capacitor.

(1) A solid electrolytic capacitor comprising:
   a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part,
   an anode-side lead frame bonded to said anode part and a cathode-side lead frame bonded to said cathode part of said capacitor element, and
   a resin sealing that seals said capacitor element,
   wherein the capacitor element and the lead frames are bonded such that the end part of said insulating layer on the side of said cathode part and the endmost part of said cathode-side lead frame in said capacitor element are spaced apart at a distance.

(2) The solid electrolytic capacitor as described in (1) above, wherein the distance between the end part of said insulating layer on the side of said cathode part and the endmost part of said cathode-side lead frame is from $\frac{1}{40}$ to $\frac{1}{2}$ of the length of the cathode part.

(3) The solid electrolytic capacitor as described in (1) or (2) above, wherein said solid electrolytic capacitor is a stacked layer capacitor element comprising a plurality of said capacitor elements stacked and bonded one on another.

(4) The solid electrolytic capacitor as described in any one of (1) to (3) above, wherein the endmost part of said lead frame has a chamfered surface.

(5) The solid electrolytic capacitor as described in any one of (1) to (4) above, wherein said lead frame has at least one mark that indicates a position for placing and bonding said single or stacked layer capacitor element.

(6) The solid electrolytic capacitor as described in any one of (1) to (5) above, wherein said lead frames have no window part in areas thereof that contact said cathode or anode part of said capacitor element.

(7) The solid electrolytic capacitor as described in any one of (1) to (6) above, wherein said lead frame comprises a copper-based material or a material whose surface is plated with a copper-based or zinc-based material.

(8) A method for manufacturing a solid electrolytic capacitor, comprising the steps of:

assigning an anode part to an end part of a substrate comprising a valve-acting metal having on the surface thereof a dielectric film layer and circumferentially providing an insulating layer having a predetermined width on said substrate in contact with said anode part;

providing an electrolytic layer on said dielectric film layer over an area other than said anode part and said insulating part and stacking an electroconducting layer on said electrolytic layer to form a cathode part, to thereby fabricate a capacitor element; and bonding lead frames to said anode part and cathode part, respectively, of said capacitor element such that the end part on the side of said cathode of said insulating layer and the endmost part of said lead frame on the side of said cathode part of said capacitor element are spaced apart at a distance.

(9) The method for manufacturing a solid electrolytic capacitor as described in (8) above, wherein the distance between the end part of said insulating layer on the side of said cathode part and the endmost part of said cathode-side lead frame is from 1/40 to 1/2 of the length of the cathode part.

(10) The method for manufacturing a solid electrolytic capacitor as described in (8) or (9) above, wherein said lead frame is bonded to a stacked layer capacitor element comprising a plurality of said capacitor elements stacked one on another.

Furthermore, the solid electrolytic capacitor of the present invention has increased bonding strength and is free of defects such as solder ball by bonding the capacitor element and the lead frame by welding as follows. That is, in a portion to be sealed with a resin, the surface of the lead frame that contacts the mold resin is not plated but low melting point metal plating is performed only in the portion where the lead frame contacts the capacitor element to bond the lead frame and the capacitor element.

Moreover, in relation to bonding between the anode end part of the capacitor element and the lead frame, the solid electrolytic capacitor of the present invention bonds the anode side lead frame and the capacitor element utilizing a dielectric film on the surface of valve-acting metal exposed on the anode end part. That is, low melting point metal plating is performed on the surface of the lead frame, the anode end part of the capacitor element is superposed on the thus plated part, and resistance welding is performed. Then the plating metal is molten due to resistance heat generation of the dielectric film exposed on the anode end part and bonding is effected. Performing such a bonding allows the low melting point metal on the surface of the lead frame to be molten because of resistance heat generation and dissolved into the dielectric film on the surface of the valve-acting metal on the end part of the capacitor element. As a result, the anode part of the capacitor element and the lead frame are firmly and integrally bonded. In the case where a stack of capacitor elements is used, the dielectric films on the surface of the stacked anode end parts are molten due to the resistance welding to dissolve into each other so that the bonding strength is improved. Therefore, the anode end part of the capacitor element can be bonded to the lead frame with ease and high reliability. In particular, electrochemically formed aluminum foil, valve-acting metal, can be bonded to a good electroconducting lead frame composed of copper, a copper alloy based material or the like with high reliability. Moreover, use of a plating metal containing no or a less amount of lead, lead alloy or the like, for example, use of undercoat plating of nickel with surface plating of tin, can prevent environmental pollution due to lead and the like problems.

That is, the present invention further provides the following solid electrolytic capacitor and method for manufacturing the solid electrolytic capacitor:

(11) A solid electrolytic capacitor comprising:

a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein in said resin sealed area, lead frame surfaces where the resin contacts have no plating and only lead frame surfaces where said lead frames contact said capacitor element have low melting temperature metal plating that bonds said lead frames and said capacitor element to each other.

(12) A solid electrolytic capacitor comprising:

a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein a lead frame surface on the side of said anode has low melting temperature metal plating, and said anode-side end part of said capacitor element is placed and bonded to said plating by resistance welding utilizing resistance heat in said dielectric film layer.

(13) The solid electrolytic capacitor as described in (11) or (12) above, wherein a surface on the anode-side lead frame has low melting temperature metal plating and said anode-side end part of said capacitor element is placed and bonded to said plating by resistance welding, and wherein a surface on the cathode-side lead frame is bonded to said cathode part such that an end part on the side of said cathode of said insulating layer and an endmost part of said lead frame on the side of said cathode part of said capacitor element are spaced apart at a distance.

(14) The solid electrolytic capacitor as described in any one of (11) to (13) above, wherein said valve-acting metal is a material selected from aluminum, tantalum, titanium, niobium and alloys thereof.

(15) The solid electrolytic capacitor as described in any one of (11) to (14) above, wherein said lead frame comprises copper or a copper alloy or a copper-based material or a material having plated on the surface thereof a copper-based material or a zinc-based material.

(16) The solid electrolytic capacitor as described in any one of (11) to (15) above, wherein said low melting temperature metal plating comprises a metal or alloy having a melting temperature lower than that of said valve-acting metal and wherein said plating layer has a thickness of 0.1 to 100 μm.

(17) The solid electrolytic capacitor as described in any one of (11) to (16) above, wherein said low melting temperature metal plating comprises undercoat nickel plating and surface tin plating.

(18) The solid electrolytic capacitor as described in any one of (11) to (17) above, wherein the bonding position of said lead frame is on a central part or circumferential surface of said stacked layer capacitor element.

(19) A method for manufacturing a solid electrolytic capacitor, comprising the steps of:

assigning an anode part to an end part of a substrate comprising a valve-acting metal having on the surface thereof a dielectric film layer and circumferentially providing an insulating layer having a predetermined width on said substrate in contact with said anode part;

providing an electrolytic layer on said dielectric film layer over an area other than said anode part and said insulating part and stacking an electroconducting layer on said electrolytic layer to form a cathode part, to thereby fabricate a capacitor element; and bonding lead frames to said anode part and cathode part, respectively, of said capacitor element such that only a lead frame surface where said lead frame contacts said capacitor element is plated with a low melting temperature metal to bond said lead frame and said capacitor element to each other.

(20) A lead frame comprising a material selected from copper or copper alloy, a material having on the surface thereof plating comprising a copper-based material or a zinc-based material and having low melting temperature metal plating only a portion in a resin sealed area that is to be contacted with a capacitor element.

DETAILED DESCRIPTION OF THE INVENTION

The present invention is described in detail below with reference to the attached drawings.

Figure 1:
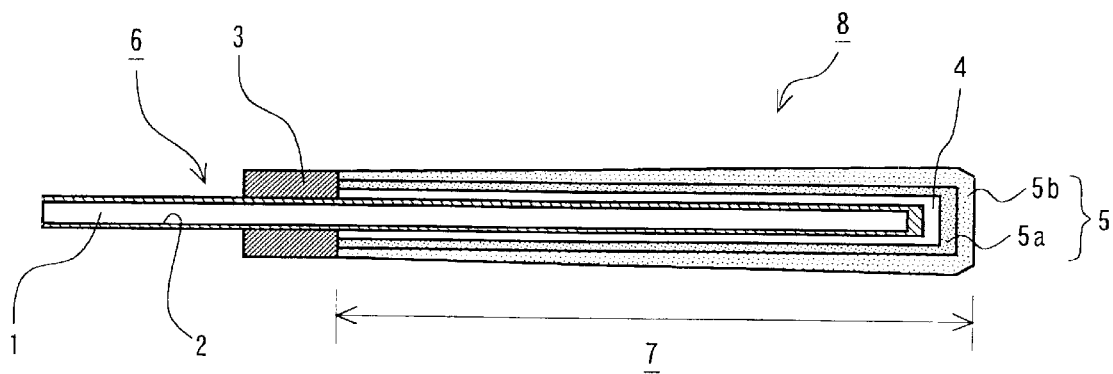
FIG. 1 is a cross section showing the structure of the single capacitor element used in the present invention.

As shown in FIG. 1, the capacitor element has a substrate (1) comprising a valve-acting metal having on the surface thereof a dielectric film layer (2). An anode part (6) is assigned to one end part of the anode substrate (1). An insulating layer (3) having a predetermined width is circumferentially provided on the anode substrate so as to contact the anode part. Then over the entire surface of the dielectric film layer excluding their portions corresponding to the anode part and the insulating part, a solid electrolytic layer (4) and an electrically conducting layer (5) are formed in sequence, thereby constructing a cathode part (7).

Capacitor Element

The substrate (1) comprises a material that may be selected from valve-acting metals that can form an oxide film on the surface thereof such as aluminum, tantalum, niobium and titanium as well as their alloys. The form of the substrate (1) may be either foil or sintered body. For example, in the case of a metal foil, a foil having a thickness of from about 40 to about 150 μm is usually used although the thickness thereof may vary depending on the use. Furthermore, the size and the shape may vary depending on the use but as a tabular element unit, a rectangular shape having a size of generally from about 1 to about 15 mm in width and from about 1 to about 15 mm in length is preferred. A rectangular shape having a size of from about 2 to about 5 mm in width and from about 2 to about 6 mm in length is more preferred.

The dielectric film (2) can be formed by conversion (electrochemical forming) treatment of the substrate. The above-mentioned metals used for making the substrate generally have a dielectric oxide film on the surface thereof due to air oxidation. However, it is preferable that conversion treatment be performed to ensure formation of a dielectric film. The conversion treatment may be performed by a conventional method.

The insulating layer (3) may be formed by coating a composition comprising an insulating resin, inorganic fine powder and a cellulose-based resin (see, JP-A-11-80596) or by sticking an insulating tape. The insulating material is not limited. Specific examples thereof include polyphenylsulfone, polyethersulfone, cyanic acid ester resin, fluororesin (e.g., tetrafluoroethylene, tetrafluoroethylene-perfluoroalkyl vinyl ether copolymer), low molecular weight polyimide and derivatives thereof, and a composition comprising soluble polyimidesiloxane and epoxy resin (see, JP-A-8-253677). The method for forming the insulating layer is not limited as long as the insulating material can be provided on the anode substrate so as to have a predetermined width.

The solid electrolytic layer (4) may be formed of an electrically conducting polymer, an electrically conducting organic material, an electrically conducting inorganic oxide or the like. A plurality of materials may be applied in sequence or a composite material may also be applied. Known electrically conducting polymers such as an electrically conducting polymer containing at least one divalent group selected from pyrrole, thiophene and aniline structures and substitution derivatives thereof as a repeating unit may be preferably used. For example, a method where a 3,4-ethylenedioxythiophene monomer and an oxidizing agent each preferably formed into a solution are separately coated one after another or simultaneously coated on the oxide film layer of the metal foil to form the solid electrolytic layer (see, JP-A-2-15611 and JP-A-10-32145) may be used.

In general, a dopant is used in the electrically conducting polymer. The dopant may be any as long as the compound has a doping ability. For example, organic sulfonic acids, inorganic sulfonic acids, organic carboxylic acids or salts thereof may be used. Aryl sulfonate-based dopants are commonly used. Examples thereof include salts of benzenesulfonic acid, toluenesulfonic acid, naphthalenesulfonic aid, anthracenesulfonic acid, and anthraquinonesulfonic acid or substitution derivatives thereof. Furthermore, as the compound capable of bringing out particularly excellent capacitor properties, compounds having one or more sulfonic acid groups and one or more quinone structures within the molecule, heterocyclic sulfonic acids, anthracenemonosulfonic acids or salts thereof may be used.

The electrically conducting layer (5) is generally formed by coating carbon paste (5a) as a substrate and silver paste (5b) but may also be formed by coating only silver paste. The electrically conducting layer may be formed by methods other than the coating.

Figure 2A:
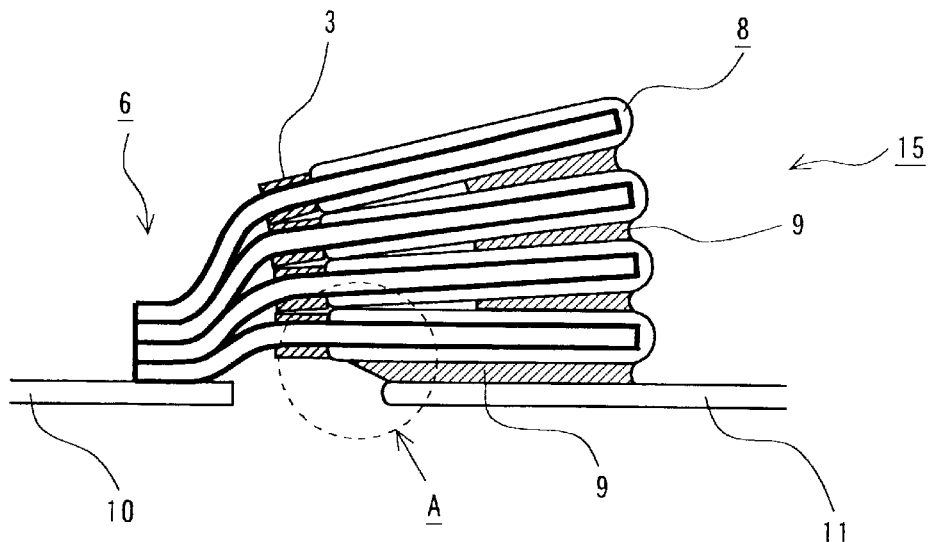
FIG. 2A is a cross section of the stacked layer-type solid electrolytic capacitor element according to the present invention.

Even when the capacitor element used is a stacked layer capacitor element, the same effects can be obtained. As shown in FIG. 2A, the stacked layer capacitor element is formed by stacking a plurality of (4 in the example illustrated) single capacitor elements (8) and filling an electrically conducting paste (9) such as silver paste in the gaps between the capacitor elements (8) to bond them to each other.

Bonding Structure of Cathode Side Lead Frame

Figure 2B:
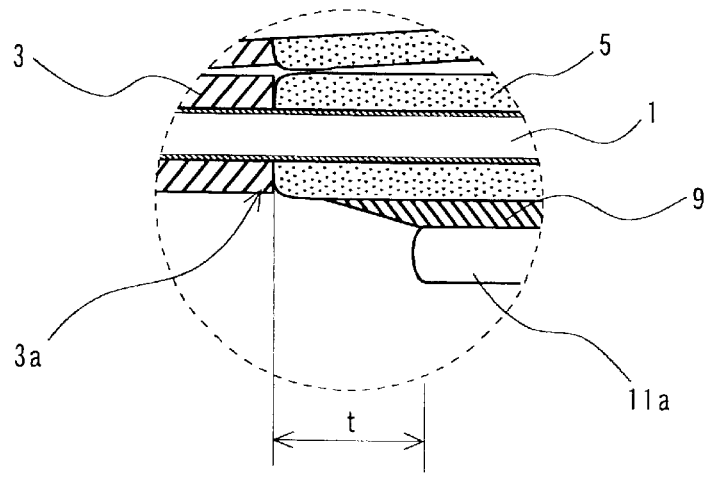
FIG. 2B is an enlarged view showing the cathode-side end part and the vicinity of the cathode end corner part of the lead frame shown in FIG. 2A.

The anode part (6) and cathode part (7) of the capacitor element are bonded to the lead frames (10) and (11), respectively. As shown in FIGS. 2A and 2B, the electrolytic capacitor of the present invention is characterized in that it has a bonding structure such that in the bonding portion between the capacitor element and the lead frame, a predetermined space is provided between the cathode side end part of the insulating layer and the endmost part of the cathode side lead frame.

That is, the electrolytic capacitor of the invention has a structure in which the end corner part (11a) of endmost part of the cathode side lead frame is kept apart from the insulating part (3) at a predetermined distance t and bonded to a predetermined position of the cathode part (7). The position (distance t) of the end corner part (11a) of endmost part of the cathode side lead frame may advantageously be set such that the endmost corner part (11a) is at a distance of 1/40 or more times the length of the cathode (7) from the cathode side end part of the insulating layer (3a) and that at most 1/2 times or less of the length of the cathode part (7) of the element. If this distance t is kept, the stress concentration of the element in the vicinity of the endmost corner part (11a) of the lead frame in the bonded part of the cathode side can be mitigated. Also, this prevents the excess silver paste from migrating from the vicinity of the boundary of the insulating part into the neighborhood of the dielectric layer. As a result, the yield is high and the leakage current does not increase after the reflow soldering or the like. In order to prevent an increase in the resistance at the cathode part, the endmost corner part (11a) of the lead frame is preferably positioned at a distance of from 1/20 to 1/3 times, more preferably from 1/10 to 1/4 times, the length of the cathode (7) from the cathode-side end (3a) of the insulating layer. It should be noted that the length of the cathode part (7) means the length from the cathode-side end (3a) of the insulating layer (3) to the endmost part where the electroconducting layer (5) is formed.

Figure 4A:
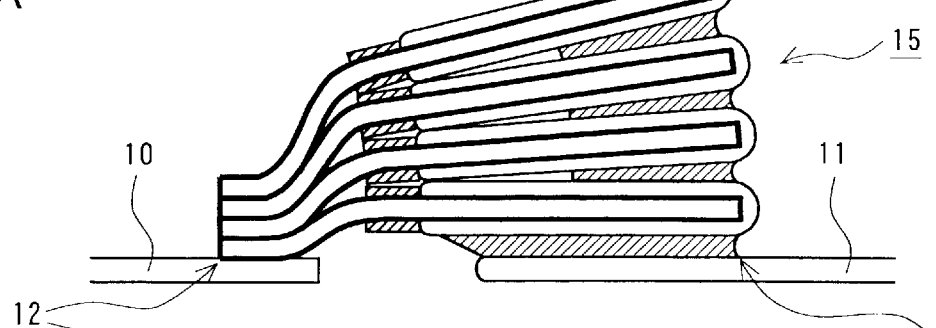
FIG. 4A is a side view of the lead frame according to the present invention.
Figure 4B:
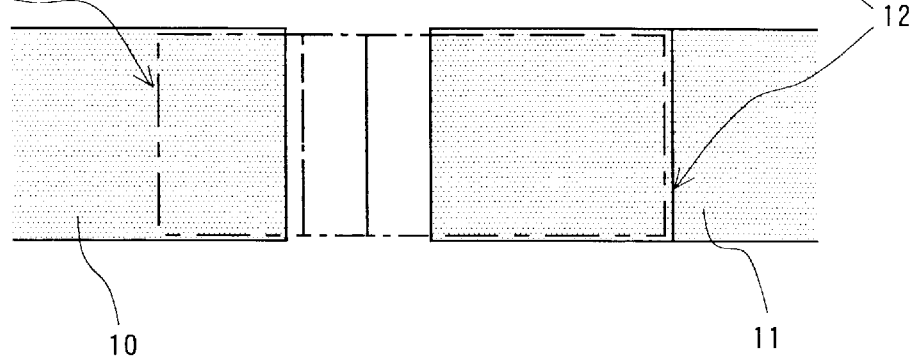
FIG. 4B is a plan view of the lead frame according to the present invention.

For exactly placing the capacitor element on the lead frame, the lead frame may advantageously be worked by half etching or by a laser ray irradiation to have marks (2) indicating position of bonding on the surface of the lead frames (10) and (11) on the side where the element is to be placed so that the position of mounting the element can be confirmed as shown in FIGS. 4A and 4B. The marks facilitate the positioning of the element. The shape of the marks is not particularly limited. The marks may have any shape such as linear or circle as long as they can tell the position.

In the solid electrolytic capacitor of the present invention, the endmost corner part (11a) of the cathode-side lead frame is chamfered in the board thickness direction as shown in FIG. 2B. That is, the edge corners of the endmost part are slightly shaved to be flat or rounded. The end corner parts of the lead frame thus worked can further relax the stress concentration of the element in the vicinity of the end corner parts.

Figure 5:
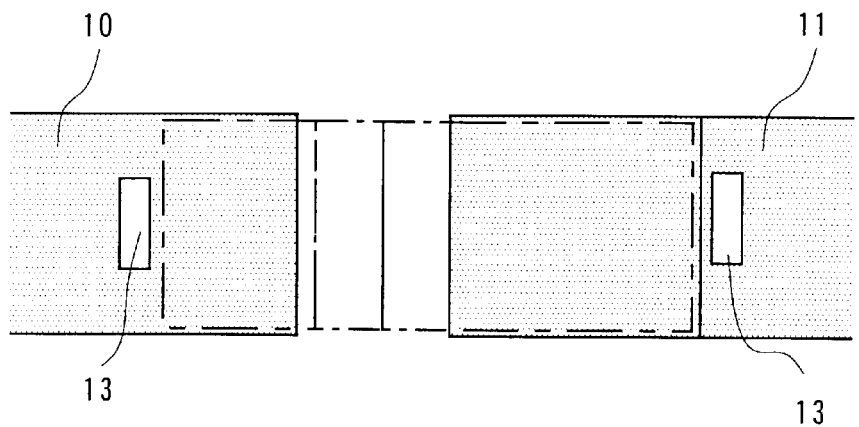
FIG. 5 is a plan view of a lead frame with a window part.

For reducing the resistance of the bonding portions of the lead frames of the cathode and anode, the lead frame is designed to have no window part as shown in FIG. 4B. A lead frame with a window part (3) provided in a predetermined position as shown in FIG. 5 is known. After bonding the capacitor element and the lead frame to each other, the capacitor element in its entirety is sealed with a mold resin. When a lead is formed along the armoring resin, the window part (13) is provided so as to facilitate the bending work of the lead frames (10) and (11) protruding from the resin. Also, it is provided in order to reduce the length of sectional outer circumference of the lead guided out from the armoring resin, thereby decreasing the amount of water entering through the interface between the lead and the resin and in turn preventing deterioration of the element. However, provision of a window portion decreases the cross section of the part concerned so that the resistance increases at that portion. For example, by providing no window part, the series resistance of the capacitor element can be improved by about 5%. In the present invention, water is prevented from entering into the element by forming a plated layer on the lead surface and using water-repellent resin as a binder for the electrically conducting layer, so that the lead frame can dispense with a window part. By providing no window part, an effect can be attained such that the time for removing the excess armoring resin padded in the window part by shot blast can be reduced.

The material for the lead frame is not particularly limited and a commonly used material may be used. However, the lead frame is preferably constituted by a copper-based material (e.g., Cu—Ni-based, Cu—Sn-based, Cu—Fe-based, Cu—Ni-Sn-based, Cu—Co-P-based, Cu—Zn-Mg-based, Cu—Sn—Ni—P-based alloys) or a material of which surface is plated with a copper-based material or a zinc-based material. If the case is so, the resistance can be further reduced by designing the shape of the lead frame or good workability can be attained in the chamfering of the endmost corner part (11a) of the lead frame.

Bonding Structure of Anode-side Lead Frame

In the case where the anode-side lead frame (10) is bonded to the anode part (6) of the capacitor element, the bonding part of the anode-side lead frame plated with a low melting point metal is used. On the plated part, the anode part (6) of which the dielectric film (2) of the capacitor element is exposed is superposed and resistance welding is practiced there. While iron-nickel-based alloys composed mainly of iron and nickel, zinc materials, copper materials, copper alloys containing tin, nickel, iron and the like in addition to copper are commonly used in various electronic hardware, the bonding method of the present invention can be widely applied to those formed of such commonly used lead frame materials. Among such materials, it is particularly useful for lead frames formed of good electroconducting materials such as copper and copper alloys.

Metals having lower melting points than the valve-acting metals or alloys are used as; the low melting point metal. Generally, silver is mainly used as the plating material for lead frames. Besides, gold, nickel, copper, tin, solder (Sn—Pb alloys) and so on may be used. In the case where electrochemically formed aluminum foil is used as the valve-acting metal, tin (melting temperature: 505° K.), lead (melting temperature: 600° K.), zinc (melting temperature: 693° K.), or alloys thereof (solder: 6Sn—4Pb), or other low melting temperature alloys (fusible alloys) and various solder materials having melting temperature lower than that of aluminum (melting temperature: 933° K.) are used. The thickness of the plating layer may be any dimension as long as the plating layer is molten such that the bonding between the valve-acting metal substrate (1) of the anode part (6) and the lead frame (10) can have a sufficient bonding strength. A suitable thickness of the plating layer is approximately 0.1 to 100 $\mu$m, preferably about 1 to about 50 $\mu$m. The plating layer may comprise undercoat plating and a surface plating thereon.

The plating metal that contains a smaller amount of lead or a lead compound, which may cause environmental pollution, is more preferred. Preferred examples include a nickel undercoat plating with tin surface plating. This contains no lead. In addition, plating of tin on the nickel undercoat plating not only increases the strength of the attachment of the tin plating to the lead frame but also increases the adhesive strengths of single capacitor element, tin plating and lead frame upon welding.

Resistance welding by superimposing the anode end (6) of the capacitor element is applied onto the low melting temperature metal plated part of the anode-side lead frame (10). This results in heat generation at the bonding portion due to the specific resistance of the dielectric film (2) of the anode end (6), and the plated metal of the lead frame (10) is molten, so that the lead frame (10) and the anode end (6) are integrally bonded. In the case where electrochemically formed aluminum foil or the like is used as the substrate, the surface of the electrochemically formed aluminum foil is molten due to the resistance heat generation of the dielectric film (2). As a result the surfaces of the electrochemically formed aluminum foils stacked on the anode part dissolve into each other so that they are integrally bonded to each other.

Figure 6:
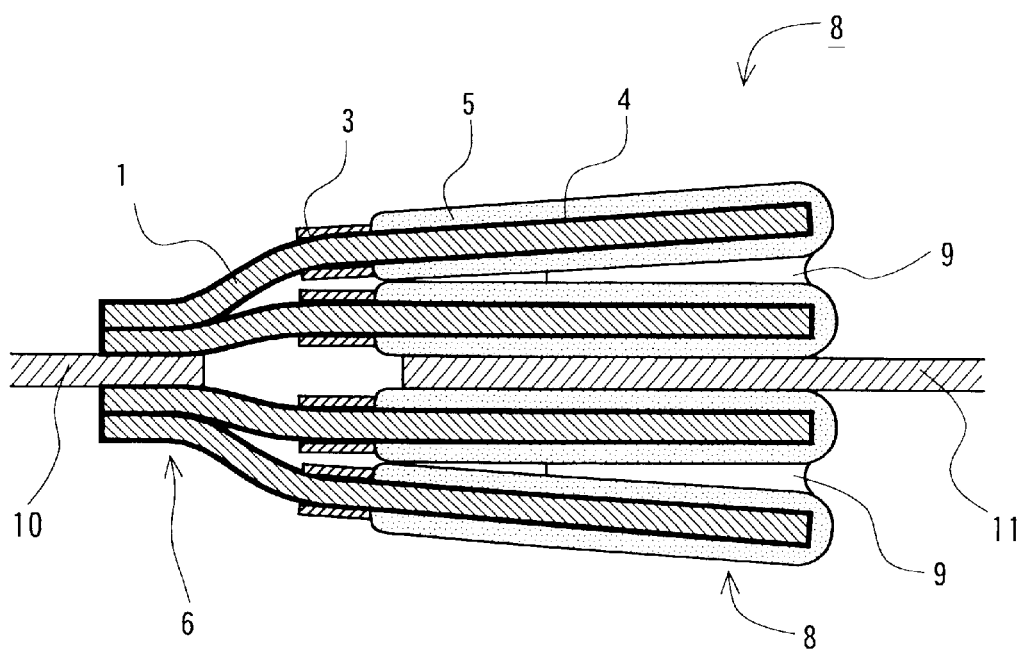
FIG. 6 is a cross section of a stacked-layer type capacitor

The bonding method by resistance welding may be applied either in the case where the lead frame is bonded on the side surface (on the circumferential side) of the stacked layer capacitor element (15) as shown in FIG. 2A, or in the case where the lead frame (10) is bonded in the central part of the stacked layer capacitor element (15) as shown in FIG. 6. In the bonding structure as shown in FIG. 6, the number of single capacitor element to be stacked is optional and the number of capacitor elements may vary between those stacked on the upper side and those stacked on the lower side of the lead frame.

Figure 7:
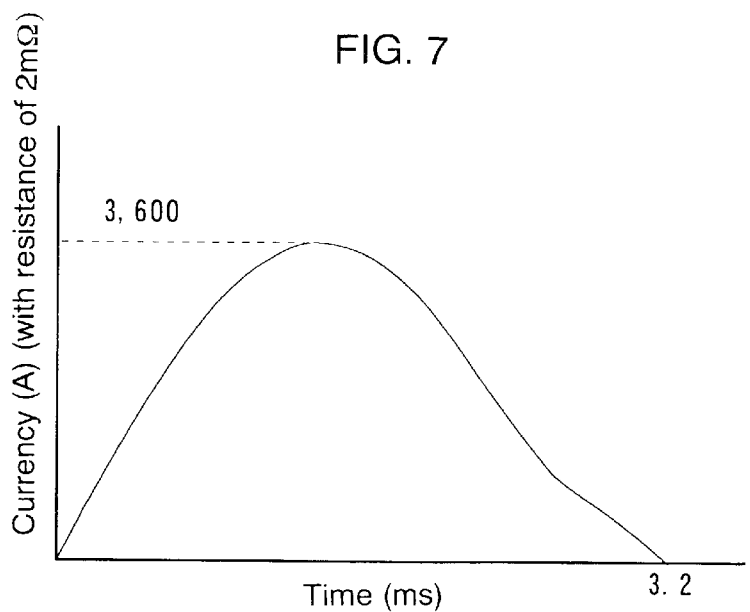
FIG. 7 is a graph illustrating the pattern of applied a current in resistance welding in the present invention.

The resistance welding may be practiced in accordance with ordinary working procedures. The welding conditions may be determined appropriately depending on the kind of valve-acting metal, shape of foil (thickness, dimension and so forth), number of stacked layers, material of lead frame, kind of low melting temperature metal, and so forth. An example is taken where a nickel-tin plated copper lead frame is used and a stack of 4 to 8 single capacitor elements made of about 100 $\mu$m-thick electrochemically formed aluminum foil is bonded to the lead frame. In this case an electrode may be applied to the bonding part under a compression of about 3 to about 5 kg. In this case welding may be performed by supplying energy of about 6.5 to about 11 W·s. This is done by applying current such that a peak current is 2 to 5 kA and current application time is 1 to 10 ms according to the current application pattern of a middle pulse as shown in FIG. 7.

Bonding by Partial Plating

Figure 8:
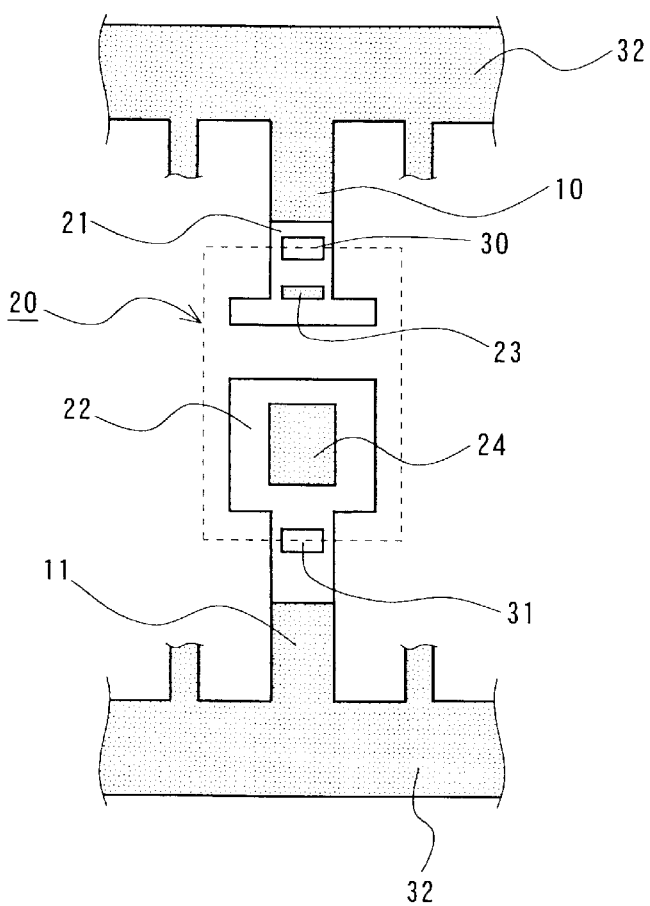
FIG. 8 is a partial plan view showing a lead frame, illustrating the partial plating of the present invention.
Figure 9:
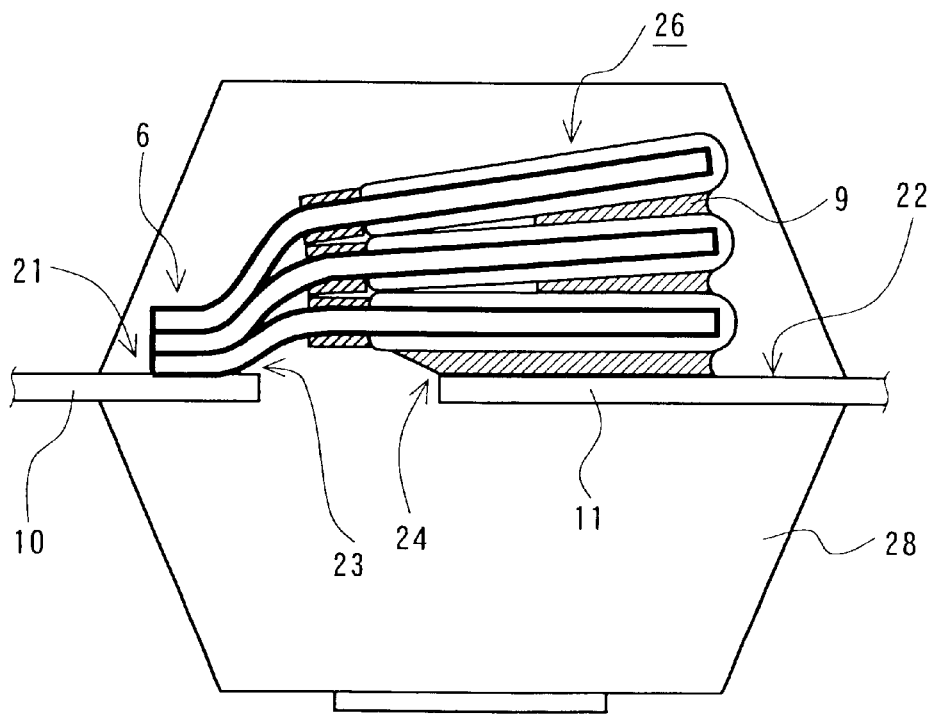
FIG. 9 is a cross section of a stacked-layer type capacitor element according to the present invention.

The solid electrolytic capacitor of the present invention may have the structure as shown in FIGS. 8 and 9. That is, in a resin sealed area (20), no plating is applied on lead frame surfaces (21) and (22) that a mold resin (28) (FIG. 9) contacts. On the other hand, low melting temperature metal plating is applied to parts (23) and (24) where the lead frame contacts the capacitor element (26) (FIG. 9) to bond the lead frames (10) and (11) to each other.

In the case where a lead frame made of a copper-based material is used, in the resin sealed area (20), the lead frame surfaces (21) and (22) that the mold resin (28) contacts as well as the opposite surface of the lead frame are in a state where the surface of the substrate of the copper-based material is exposed. On the other hand, low melting temperature metal plating is applied onto surface parts (23) and (24) where the lead frames contact the capacitor element (26). Examples of the low melting temperature metal plating include tin plating provided on nickel plating, and so on. In the figures, the parts (30) and (31) are window parts (punched parts). As described above, these parts do not have to be provided. The part (32) of the lead frame that is deviated from the mold resin may be plated. Therefore, in the resin sealed area, the parts (23) and (24) where the lead frames contact the capacitor element are plated but the parts (21) and (22) that contact the mold resin (28) are not plated.

Figure 10:
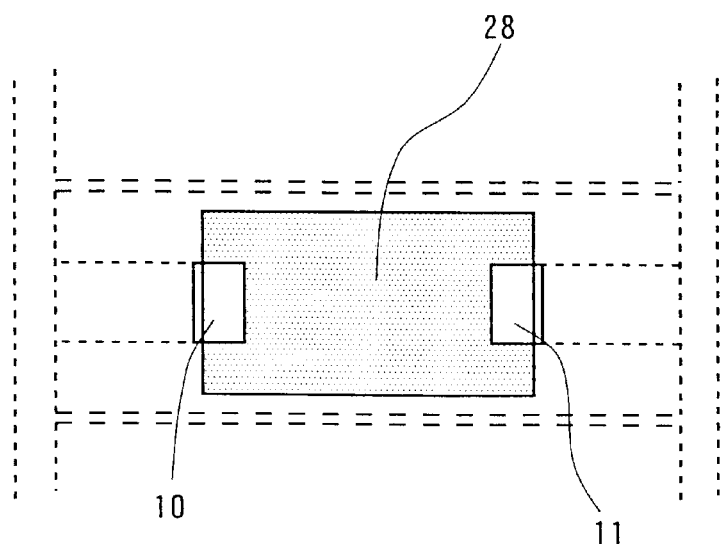
FIG. 10 is a partial plan view showing a resin-molded stacked-layer type capacitor element according to the present invention.
Figure 11:
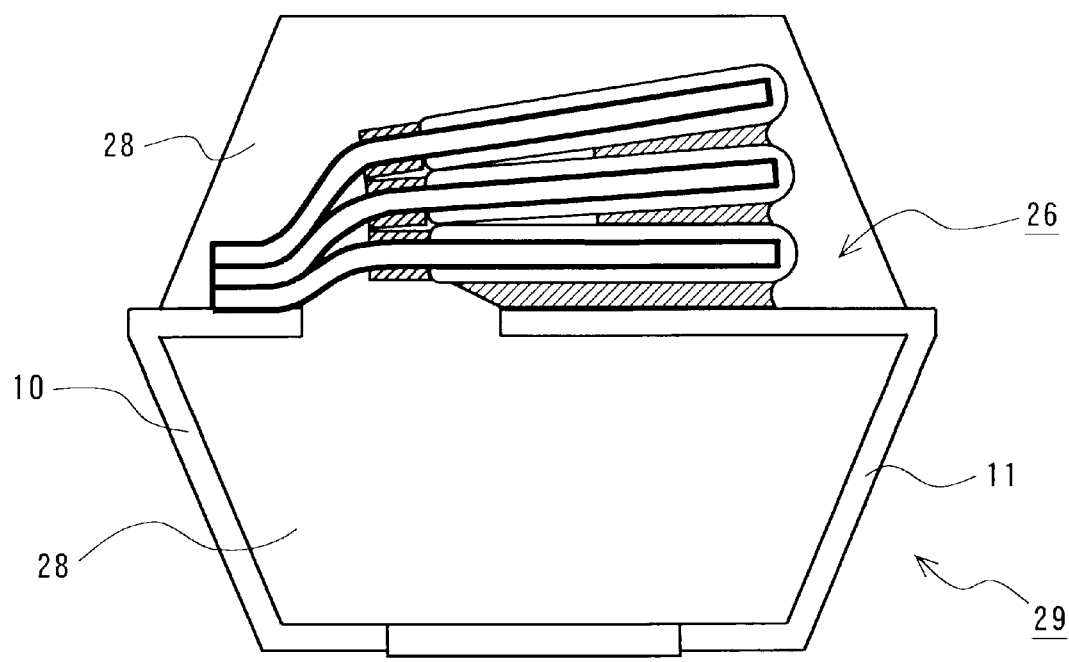
FIG. 11 is a cross section of the stacked-layer type solid electrolytic capacitor according to the present invention.

As shown in FIG. 9, in the resin sealed area, only the parts (23) and (24) of lead frame surfaces that intimately contact the capacitor element are plated. On the plated parts single capacitor elements are stacked. Then, on the cathode side, the gaps between the cathode parts (7) and the gap between the cathode part (7) and lead frame (11) are filled with the electroconducting paste (9). On the other hand, on the anode side, the anode parts (6) of the capacitor elements are intimately contacted each other, and while pressing the anode parts (6) are bonded to each other and the lower surface of the anode part (6) and the lead frame surface (23) are bonded to each other by spot welding. Thus, a stacked layer capacitor element (26) is obtained. After the stacked layer capacitor element (26) is molded with a resin (28) as shown in FIGS. 10 and 11, the resin molded capacitor element is cut off from the lead frames and the leads (10) and (11) are bent to obtain a solid electrolytic capacitor (29).

BEST MODE OF THE INVENTION

Hereinafter, the present invention will be illustrated in detail by examples. However, the scope of the present invention should not be construed as being limited to the following examples.

EXAMPLE 1

A single capacitor element (see FIG. 1) was manufactured as follows. An aluminum etched foil having on the surface thereof an alumina dielectric film was slit into a predetermined size of 90 µm in thickness, 5 mm in length and 3 mm in width. This was used as a substrate (1). The anode was assigned to an end part (part of 1 mm in length and 3 mm in width) of the foil. An insulating layer (3) having a width of 1 mm was formed (circumferentially provided) thereon like a head-band so as to contact the anode part. The remaining part (3 mm in length×3 mm in width) was subjected to electrochemical forming with a 10 mass % aqueous ammonium adipate solution at 13 V to form a dielectric film (2) on the cut end parts (cutting plane). The resulting substrate was dipped in an aqueous solution prepared to have a composition such that ammonium persulfate was 20 mass % and sodium anthraquinone-2-sulfonate was 0.1 mass %, and then dipped in 1.2 mol/L of an isopropanol solution having dissolved therein 5 g of 3,4-ethylenedioxythiophene (Baytron (trademark) M, manufactured by Bayer AG). The substrate was taken out, left standing for 10 minutes in an environment of 60° C. to thereby complete the oxidation polymerization, and then washed with water. This polymerization reaction treatment and the washing step, each of which was repeated 25 times to form a solid electrolytic layer (4) comprising an electrically conducting polymer. Thereafter, the substrate was dipped in carbon paste followed by solidification to form thereon an electrically conducting layer (carbon paste layer) (5a) and further dipped in silver paste followed by solidification to form an electrically conducting layer (silver paste layer) (5b), thereby obtaining a single capacitor element (8) as shown in FIG. 1.

Subsequently, four sheets of the single capacitor element (8) were placed on lead frames having no window part, marked by half etching, with the cathode-side lead frame being chamfered at its endmost corner part, such that the distance (t) between the endmost corner part (11a) of the cathode-side lead frame and the cathode-side end (3a) of the insulating layer (3) of the element (hereinafter referred to as the lead frame position) was 0.5 mm. The gaps between the cathode parts of elements and the gap between the cathode part and the lead frame (cathode side) were joined with silver paste (9) to obtain a stacked layer capacitor element (15) shown in FIGS. 2A, 2B, 4A and 4B.

After forming a lead, the stacked layer element as a whole was sealed with epoxy resin (28) and then aged at 120° C. for 2 hours while applying a rated voltage (20 V). In this way, 30 units in total of stacked layer type solid electrolytic capacitors were manufactured. The capacitor element was evaluated by the yield of capacitor, the leakage current level after the reflow test and the number of defectives. The results obtained are shown in Table 1.

EXAMPLE 2

Capacitors were manufactured and evaluated in the same manner as in Example 1 except that the lead frame position was changed to 1.0 mm. The results obtained are shown in Table 1.

EXAMPLE 3

Capacitors were manufactured and evaluated in the same manner as in Example 1 except that the lead frame position was changed to 1.5 mm. The results obtained are shown in Table 1.

EXAMPLE 4

Capacitors were manufactured and evaluated in the same manner as in Example 1 except that the lead frame position was changed to 1.5 mm and the lead frame end corner part was not chamfered. The results obtained are shown in Table 1.

EXAMPLE 5

Capacitors of Example 5 were manufactured and evaluated in the same manner as in Example 2 except that sodium 4-morpholinopropanesulfonate was used in place of sodium anthraquinone-2-sulfonate in Example 2. The results obtained are shown in Table 1.

EXAMPLE 6

Capacitors of Example 6 were manufactured and evaluated in the same manner as in Example 2 except that sodium anthracene-1-sulfonate was used in place of sodium anthraquinone-2-sulfonate in Example 2. The results obtained are shown in Table 1.

EXAMPLE 7

Capacitors of Example 7 were manufactured and evaluated in the same manner as in Example 2 except that sodium 1-naphthalenesulfonate was used in place of sodium anthraquinone-2-sulfonate and N-methylpyrrole was used in place of 3,4-ethylenedioxythiophene in Example 2. The results obtained are shown in Table 1.

Comparative Example 1

Figure 3:
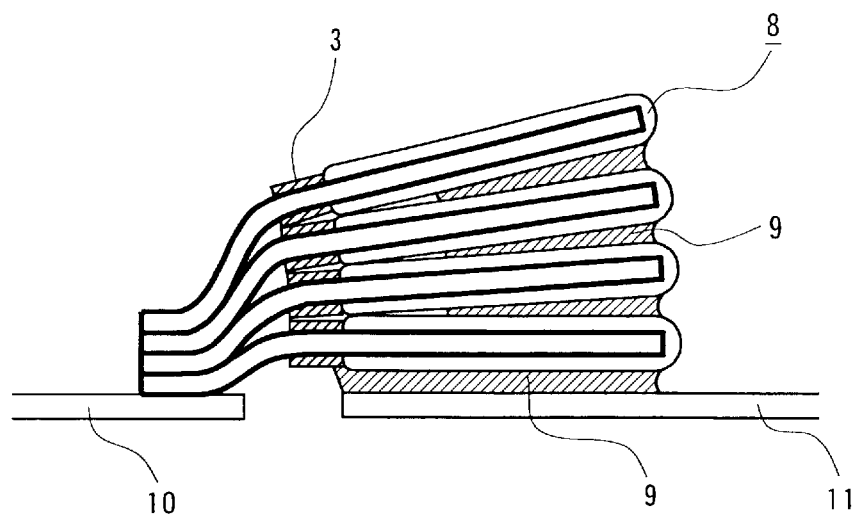
FIG. 3 is a cross section of a solid electrolytic capacitor element where the lead frame position in Comparative Examples 1 and 2 is 0 mm (t=0).

Capacitors were manufactured and evaluated in the same manner as in Example 1 except for a critical difference from Example 1. That is, the cathode end corner part of the lead frame was contacted with the cathode-side end of the insulating layer of the element (lead frame position: 0.0 mm) as shown in FIG. 3. The results obtained are shown in Table 1.

Comparative Example 2

Capacitors were prepared in the same manner as in Comparative Example 1 except that the lead frame end corner part was not chamfered. The results obtained are shown in Table 1.

TABLE 1

| | Lead Frame Position (mm) | Chamfering of End Corner Part | Yield (%) (Note 1) | Leakage Current after Reflow Soldering Test (Note 2) | | Ratio of Defective |
|---|---|---|---|---|---|---|
| | | | | Average ($\mu$A) | Range ($\mu$A) | |
| Example 1 | 0.5 | chamfered | 85 | 0.4 | 0.6 | 0/30 |
| Example 2 | 1.0 | chamfered | 93 | 0.3 | 0.5 | 0/30 |
| Example 3 | 1.5 | chamfered | 88 | 0.4 | 0.5 | 0/30 |
| Example 4 | 1.5 | none | 79 | 0.4 | 0.8 | 0/30 |

TABLE 1-continued

|  | Lead Frame Position (mm) | Chamfering of End Corner Part | Yield (%) (Note 1) | Leakage Current after Reflow Soldering Test (Note 2) | | Ratio of Defective |
|---|---|---|---|---|---|---|
|  |  |  |  | Average ($\mu$A) | Range ($\mu$A) |  |
| Example 5 | 1.0 | chamfered | 90 | 0.3 | 0.5 | 0/30 |
| Example 6 | 1.0 | chamfered | 94 | 0.4 | 0.5 | 0/30 |
| Example 7 | 1.0 | chamfered | 88 | 0.4 | 0.6 | 0/30 |
| Comparative Example 1 | 0.0 | chamfered | 72 | 0.7 | 3.2 | 1/30 |
| Comparative Example 2 | 0.0 | none | 74 | 0.6 | 4.0 | 2/30 |

Note 1: Capacitors with a leakage current of 1 $\mu$A or less were passed and the yield (%) was calculated by (units not passed/total units) × 100.
Note 2: The average of leakage current values after the heat treatment in a reflow furnace (at a maximum temperature of 240° C. for 30 seconds) and the dispersion range thereof are shown. Capacitors with 3 $\mu$A or more were rated defective and the number of defectives is shown (n = 30).

Capacitors of Comparative Examples 1 and 2 where the cathode end corner part of the lead frame was present in the vicinity of the insulator layer of the stacked layer element were inferior both in the yield and the reflow soldering test results to those of Examples 1 to 7.

By comparing Example 3 and Example 4, the effect of the chamfering of the cathode end corner part was verified. More specifically, capacitors of Example 3 with "chamfered" exhibited good results in the yield and the leakage current value after the reflow soldering test.

In the above-described Examples, the lead frames having no window part as shown in FIGS. 4A and 4B and marked by half etching or the like were used. However, the lead frame does not have to have marks if there is another method for enabling exact placing of the capacitor element. The shape of the lead frame is not limited to those shown in the figures but needless to say, any shape may be used as long as the same effects can be obtained. In the Examples above of the present invention, the material for the solid electrolyte, the method for forming the solid electrolyte, the material for the electrode and the method forming it are described by referring to specific examples thereof, however, the scope of the present invention is by no means limited thereto.

EXAMPLE 8

An aluminum etched foil having a prescribed capacitance of 119 $\mu$F/cm$^2$ was slit into a rectangle (3 mm×10 mm) and a polyimide solution was coated circumferentially on both surfaces and both ends of the foil in a width of 1 mm such that the foil was divided into two parts (divided into parts of 4 mm and 5 mm) in the longitudinal direction and dried, thus forming a masking (insulating layer). The endmost part (3 mm×4 mm part) of the aluminum etched foil was electrochemically formed by dipping it in a 10 mass % aqueous ammonium adipate solution at 13 V to form a dielectric film on the cut end parts.

Then, the resulting oxide film part (3 mm×4 mm part) was in 1.2 mol/L of an isopropanol solution having dissolved therein 5 g of 3,4-ethylenedioxythiophene (Baytron (trademark) M, manufactured by Bayer AG) and dried. Then, the resulting substrate was dipped in a 2 mol/L aqueous ammonium persulfate solution adjusted so as to contain 0.07 mass % of sodium anthraquinone-2-sulfonate. Subsequently, the aluminum foil was left standing in an environment of about 40° C. for about 10 minutes to carry out the oxidation polymerization. The polymerization reaction treatment and the washing step were each repeated 25 times in total to form an electroconducting polymer layer (poly(3,4-ethylenedioxythiophene)) in the micro pores of the etched aluminum foil. The etched aluminum foil with the electroconducting polymer layer formed therein was washed in warm water at 50° C. and then dried at 100° C. for 30 minutes to form a solid electrolytic layer. Then, on the part of the aluminum foil where the solid electrolytic layer (electroconducting polymer layer) was formed, carbon paste and silver paste were applied to complete a single capacitor element.

On the other hand, lead frames made of copper were undercoat plated to a thickness of 0.8 $\mu$m on both surfaces at anode-side end part of the lead frame. A surface plating of tin was performed thereon to a thickness of 10 $\mu$m. On the both surfaces of each lead frame was thus obtained two sheets of the single capacitor element were stacked. The end part where the electrochemically formed aluminum foil was exposed was intimately contacted onto the plated part of the anode lead frame. This portion was subjected to resistance welding (energy: 6.5 W·s) in accordance with the current application pattern shown in FIG. 7 while pressing that portion by the electrode of the resistance welding machine (compression force: 3.6 kg). Thus, the anode lead frame and the end part of single capacitor element were bonded together. Upon measurement of tensile strength of the bonded portion, it was found that the bonded portion had a tensile strength of 25 kgf/cm$^2$. After bonding the cathode-side lead frame to the electrolyte part in the center of the stacked capacitor element with silver paste, the stacked capacitor element as a whole was sealed with epoxy resin and the resin molded capacitor element was aged at 120° C. for 2 hours with applying a rated voltage. In this way, 30 units in total of chip-type solid electrolytic capacitors were manufactured. The electrolytic capacitors were subjected to reflow heat resistance tests by passing the temperature region at 230° C. in 30 seconds. Furthermore, the leakage current level after 1 minute from the application of the rated voltage was measured. An average value was obtained on samples that showed measured values of 1 CV or less. As a result, it revealed that an average leakage current was 0.001 $\mu$A or less, and the ratio of heat resistance defectives at a leakage current level of 11.8 $\mu$A (0.04CV) or more was 1/30 or less.

EXAMPLE 9

Anode lead frame was bonded in the same manner as in Example 8 except that four sheets of the single capacitor element were stacked for each of the samples and the compression force applied to the stacked structure was changed to 5.1 kg and the welding current energy to 10.7 W·s. The anode lead frame showed a bond strength of 18 kgf/cm$^2$. 30 units of chip-type solid electrolytic capacitor fabricated using the stacked capacitor element had an average leakage current of 0.002 $\mu$A or less and the ratio of heat resistance defectives was zero.

EXAMPLE 10

Anode lead frame was bonded in the same manner as in Example 8 except that undercoat nickel plating (thickness: 0.1 $\mu$m) and surface tin plating (thickness: 3 $\mu$m) were practiced on the end part of the anode lead frame to fabricate a chip-type stacked capacitor element. The anode lead frame showed a bond strength of 10 kgf/cm$^2$. 30 units of chip-type solid electrolytic capacitor fabricated using the stacked capacitor element had an average leakage current of 0.003 µA or less and a ratio of heat resistance defectives of 1/30 or less.

Comparative Example 3

Resistance welding of anode lead frame was performed under the same conditions as in Example 8 except that no undercoat plating or surface plating was practiced on the anode lead frame. As a result, the welded portion was somewhat deformed due to the electrode of the welding machine applied thereto but no welding of the chemically formed aluminum foil occurred, so that bonding of the lead frame was unsuccessful.

EXAMPLE 11

A single capacitor element (8) as shown in FIG. 1 was fabricated as follows. An aluminum (valve-acting metal) etched foil of 90 µm in thickness, 5 mm in length and 3 mm in width having on the surface thereof an alumina dielectric film was used as a substrate (1). The anode (6) was assigned to an end part of 2 mm in length and 3 mm in width of the foil. The remaining part of 3 mm in length×3 mm in width was subjected to electrochemical forming with a 10 mass % aqueous ammonium adipate solution at 13 V to form a dielectric film (2) on the cut end parts, thereby converting it to a dielectric. The surface of the dielectric was impregnated with an aqueous solution prepared to have a composition such that ammonium persulfate was 20 mass % and sodium anthraquinone-2-sulfonate was 0.1 mass %. Then, the dielectric was dipped in 1.2 mol/L of an isopropanol solution having dissolved therein 5 g of 3,4-ethylenedioxythiophene. The substrate was taken out, left standing for 10 minutes in an environment of 60° C. to thereby complete the oxidation polymerization, and then washed with water. The polymerization reaction treatment and the washing step were each repeated 25 times to form a solid electrolytic layer (4) comprising an electrically conducting polymer. Then, the substrate was dipped in a carbon paste tank, followed by solidification to form thereon an electrically conducting layer (5a). It was further dipped in a silver paste tank, followed by solidification to form an electrically conducting layer (5b). This procedure was repeated such that the thickness of the electroconducting layer (5) was gradually increased toward the endmost part thereof. Thus, a single capacitor element (8) having a relatively thick endmost part was obtained.

Next, a copper substrate of 0.1 mm in thickness was punched by a press to the shape of lead frame as shown in FIG. 8. On the surface of the lead frame were practiced nickel undercoat plating and tin plating in sequence. It should be noted that in the resin sealed area (20), the parts (21) and (23) that contact the mold resin (28) were not plated but only the parts (23) and (24) that intimately contact the capacitor element were plated. Three sheets of the single capacitor element (8) were stacked on the plated parts in the resin sealed area as shown in FIG. 9 and the anode parts (6) were aligned on the left hand side and the cathode parts (7) were aligned on the right hand side in FIG. 9. The gaps between the cathode parts and gaps between the cathode part and the lead frame (11) were bonded with the electroconducting paste (9). Thus, a stacked layer capacitor element having the single capacitor elements (8) stacked widened toward the end. The anode parts (6) were folded and bonded to each other by spot welding. Also, the one surface of the lead frame and the lower surface of the lowermost anode part (6) were bonded to each other by spot welding. Thus, the stacked layer capacitor element (26) as shown in FIG. 9 was obtained. After the stacked layer capacitor element as a whole was molded with the epoxy resin (28) as shown in FIGS. 9 and 10, the resin burrs were removed by shot blasting of resin beads. Then, the resin sealed capacitor element was cut off and the leads were folded into a predetermined shape as shown in FIG. 11 to obtain a solid electrolytic capacitor (29).

The solid electrolytic capacitor when subjected to heat treatment upon forming a stacked layer capacitor element exhibits a low ratio of solder ball generation and has high strength of the bonded portion between the lead frame and the capacitor element. It had approximately the same levels of average leakage current and ratio of heat resistance defectives as in Examples 8 to 10.

INDUSTRIAL APPLICABILITY

As described in the foregoing, the present invention has the following excellent effects.
(a) When a capacitor element is placed and bonded on lead frames, the element is placed while preventing the end part of the cathode-side lead frame from approaching the neighborhood of the insulating layer of the element but keeping a predetermined distance therebetween, and
(b) the end corner part of the end corner part is chamfered, thereby providing a capacitor having good yield and high heat resistance.
(c) Furthermore, use of lead frames having no window part provides a special effect of preventing an increase in the resistance of the lead frames.
(d) Also, a lead frame without window part marked by half etching or the like is used and therefore precise positioning of the element placed on the lead frame is facilitated.
(e) Resistance welding can be utilized to bond the anode-side lead frame and the valve-acting metal foil (plate) of the capacitor element to each other easily and firmly. Therefore, stacked layer capacitor elements and solid electrolytic capacitors using them can be manufactured economically. In particular, a lead frame comprising a good electroconducting material such as copper or copper alloy and a substrate comprising electrochemically formed aluminum foil can be bonded to each other with high reliability so that the stacked layer capacitor element and solid electrolytic capacitor using it of the present invention are highly practical. In addition, plating materials containing no lead or lead compound can be used so that the present invention is free of the problems of environmental pollution.
(f) In the resin sealed area, application of low melting temperature plating limited to the portion where the capacitor element contacts prevents the occurrence of defects in bonding due to solder ball or the like, so that a highly reliable solid electrolytic capacitor can be obtained that includes bonded portion with improved stability between the lead frames and the capacitor element.

What is claimed is:
1. A solid electrolytic capacitor comprising: a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein the capacitor element and the lead frames are bonded such that the end part of said insulating layer on the side of said cathode part and the endmost part of said cathode-side lead frame in said capacitor element are spaced apart at a distance and the distance is from 1/20 to 1/3 of the length of the cathode part, and wherein the endmost corner part of said cathode-side lead frame is chamfered in a board thickness direction.

2. The solid electrolytic capacitor as claimed in claim 1, wherein said solid electrolytic capacitor is a stacked layer capacitor element comprising a plurality of said capacitor elements stacked and bonded one on another.

3. The solid electrolytic capacitor as claimed in claim 1, wherein said lead frame has at least one mark that indicates a position for placing and bonding said single or stacked layer capacitor element.

4. The solid electrolytic capacitor as claimed in claim 1, wherein said lead frames have no window part in areas thereof that contact said cathode or anode part of said capacitor element.

5. The solid electrolytic capacitor as claimed in claim 1, wherein said lead frame comprises a copper-based material or a material whose surface is plated with a copper-based or zinc-based material.

6. A method for manufacturing a solid electrolytic capacitor, said solid electrolytic capacitor comprising: a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein the capacitor element and the lead frames are bonded such that the end part of said insulating layer on the side of said cathode part and the endmost part of said cathode-side lead frame in said capacitor element are spaced apart at a distance and the distance is from 1/20 to 1/3 of the length of the cathode part, and wherein the endmost corner part of said cathode-side lead frame is chamfered in a board thickness direction, said method comprising the steps of:

assigning an anode part to an end part of a substrate comprising a valve-acting metal having on the surface thereof a dielectric film layer and circumferentially providing an insulating layer having a predetermined width on said substrate in contact with said anode part;

providing an electrolytic layer on said dielectric film layer over an area other than said anode part and said insulating part and stacking an electroconducting layer on said electrolytic layer to form a cathode part, to thereby fabricate a capacitor element; and bonding lead frames to said anode part and cathode part, respectively, of said capacitor element such that the end part on the side of said cathode of said insulating layer and the endmost part of said lead frame on the side of said cathode part of said capacitor element are spaced apart at a distance and the distance is from 1/20 to 1/3 of the length of the cathode part.

7. The method for manufacturing a solid electrolytic capacitor as claimed in claim 6, wherein the distance between the end part of said insulating layer on the side of said cathode part and the endmost part of said cathode-side lead frame is from 1/40 to 1/2 of the length of the cathode part.

8. The method for manufacturing a solid electrolytic capacitor as claimed in claim 6, wherein said lead frame is bonded to a stacked layer capacitor element comprising a plurality of said capacitor elements stacked one on another.

9. A solid electrolytic capacitor comprising:

a capacitor element comprising a substrate comprising a valve-acting metal having a dielectric film layer on the surface thereof the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein in said resin sealed area, lead frame surfaces where the resin contacts have no plating and only lead frame surfaces where said lead frames contact said capacitor element have plating of a low melting temperature metal or alloy having a lower melting point than the valve-acting metal that bonds said lead frames and said capacitor element to each other.

10. The solid electrolytic capacitor as claimed in claim 9, wherein a surface on the anode-side lead frame has low melting temperature metal plating and said anode-side end part of said capacitor element is placed and bonded to said plating by resistance welding, and wherein a surface on the cathode-side lead frame is bonded to said cathode part such that an end part on the side of said cathode of said insulating layer and an endmost part of said lead frame on the side of said cathode part of said capacitor element are spaced apart at a distance.

11. The solid electrolytic capacitor as claimed in claim 9, wherein said valve-acting metal is a material selected from aluminum, tantalum, titanium, niobium and alloys thereof.

12. The solid electrolytic capacitor as claimed in claim 9, wherein said lead frame comprises copper or a copper alloy or a copper-based material or a material having plated on the surface thereof a copper-based material or a zinc-based material.

13. The solid electrolytic capacitor as claimed in claim 9, wherein said low melting temperature metal plating comprises a metal or alloy having a melting temperature lower than that of said valve-acting metal and wherein said plating layer has a thickness of 0.1 to 100 $\mu$m.

14. The solid electrolytic capacitor as claimed in claim 9, wherein the bonding position of said lead frame is on a central part or circumferential surface of said stacked layer capacitor element.

15. A solid electrolytic capacitor comprising:

a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein a lead frame surface on the side of said anode has plating of a low melting temperature metal or alloy having a lower melting point than the valve-acting metal, and said anode-side end part of said capacitor element is placed and bonded to said plating by resistance welding with supplying energy of about 6.5 to about 11 W·s, utilizing resistance heat in said dielectric film layer.

16. A method for manufacturing a solid electrolyte capacitor, said solid electrolytic capacitor comprising: a capacitor element comprising a substrate comprising a valve-acting metal having a dielectric film layer on the surface thereof the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein in said resin sealed area, lead frame surfaces where the resin contacts have no plating and only lead frame surfaces where said lead frames contact said capacitor element have plating of a low melting temperature metal or alloy having a lower melting point than the valve-acting metal that bonds said lead frames and said capacitor element to each other, said method comprising the steps of:

assigning an anode part to an end part of a substrate comprising a valve-acting metal having on the surface thereof a dielectric film layer and circumferentially providing an insulating layer-having a predetermined width on said substrate in contact with said anode part;

providing an electrolytic layer on said dielectric film layer over an area other than said anode part and said insulating part and stacking an electroconducting layer on said electrolytic layer to form a cathode part, to thereby fabricate a capacitor element;

providing an anode-side lead frame bonded to said anode part and a cathode-side lead frame bonded to said cathode part of said capacitor element; and sealing said capacitor element with a resin sealing;

bonding lead frames to said anode part and cathode part, respectively, of said capacitor element such that in said resin sealed area, lead frame surfaces where the resin contacts have no plating and only lead frame surfaces where said lead frames contact said capacitor element have plating of a low melting temperature metal or alloy having a lower melting point than the valve-acting metal that bonds said lead frames and said capacitor element to each other.

17. A solid electrolytic capacitor comprising:

a capacitor element comprising a substrate comprising a valve-acting metal having a dielectric film layer on the surface thereof, the substrate having end parts, an anode part assigned to one end part of said substrate, an insulating part comprising an insulating layer of a predetermined width provided circumferentially on the substrate in contact with said anode part, and a cathode part comprising a solid electrolytic layer and an electroconducting layer stacked in sequence on said dielectric film layer over an area other than said anode part and said insulating part, an anode-side lead frame bonded to said anode part and a cathode-side lead frame bonded to said cathode part of said capacitor element, and a resin sealing that seals said capacitor element, wherein in said resin sealed area, lead frame surfaces where the resin contacts have no plating and only lead frame surfaces where said lead frames contact said capacitor element have low melting temperature metal plating-that bonds said lead frames and said capacitor element to each other, and wherein said low melting temperature plating comprises undercoat nickel plating and surface tin plating.

* * * * *